(12) United States Patent
Elgart

(10) Patent No.: US 6,973,456 B1
(45) Date of Patent: Dec. 6, 2005

(54) DATABASE SYSTEM AND METHOD FOR ORGANIZING AND SHARING INFORMATION

(76) Inventor: Ross Elgart, 2408 Vista Hogar, Newport Beach, CA (US) 92660

( * ) Notice: Subject to any disclaimer, the term of this patent is extended or adjusted under 35 U.S.C. 154(b) by 345 days.

(21) Appl. No.: 09/927,851

(22) Filed: Aug. 10, 2001

Related U.S. Application Data

(60) Provisional application No. 60/224,265, filed on Aug. 10, 2000.

(51) Int. Cl.⁷ ............................................. G06F 17/30
(52) U.S. Cl. ............................. 707/10; 707/6; 707/101; 707/104.1; 709/218; 709/219; 705/14; 705/34
(58) Field of Search ........................... 707/1–7, 103 R, 707/9, 10, 104.1, 201, 203, 100, 101; 709/218, 709/219, 300; 705/14, 34

(56) References Cited

U.S. PATENT DOCUMENTS

| | | | | | |
|---|---|---|---|---|---|
| 5,146,552 | A | * | 9/1992 | Cassorla et al. ............. | 715/512 |
| 5,729,730 | A | * | 3/1998 | Wlaschin et al. .............. | 707/3 |
| 5,835,923 | A | * | 11/1998 | Shibata et al. ............... | 715/526 |
| 5,892,908 | A | * | 4/1999 | Hughes et al. .............. | 709/250 |
| 5,944,791 | A | * | 8/1999 | Scherpbier ................... | 709/218 |
| 6,073,105 | A | * | 6/2000 | Sutcliffe et al. ................ | 705/1 |
| 6,233,600 | B1 | * | 5/2001 | Salas et al. .................. | 709/201 |
| 6,366,923 | B1 | * | 4/2002 | Lenk et al. ............... | 707/104.1 |
| 6,466,970 | B1 | * | 10/2002 | Lee et al. .................... | 709/217 |

OTHER PUBLICATIONS

Description of AmicusAttorney.com legal research features on http://www.amicusattorney.com, http://www.amicusattorney.com/products/amicus/index.html, & http://www.amicusattorney.com/products/amicus/legal_research.html, printed on Nov. 14, 2001.
Description of Netscape Navigator "Bookmark" feature in Netscape Communicator V. 4.75 Help windows, printed on Oct. 23, 2001.
Description of Internet Explorer "Favorites" feature in Internet Explorer V. 5.50 Help windows, printed on Oct. 23, 2001.

* cited by examiner

*Primary Examiner*—Charles Rones
*Assistant Examiner*—Jacques Veillard
(74) *Attorney, Agent, or Firm*—Peter M. Midgley

(57) ABSTRACT

A database stores records of resources that include web pages and web-accessed files, electronic files, and hardcopy documents. The URL of a web page or web-accessed file, the file access path of an electronic file, and the location of a hardcopy document are stored in the records. The records can be created by a user. The user can store an Internet link record when the user is browsing the web page or reviewing the web-accessed file. The user can store an electronic file record when the user is exploring files. The user can enter descriptions and notes that associate with the records. The resources can be organized into categories and sub-categories. For example, certain web pages and web-accessed files, electronic files, and hardcopy documents that cover the same subject can be grouped into one category. The records, including the descriptions and notes of the records, can be shared by other users that have access to the same database.

31 Claims, 9 Drawing Sheets

ITEM TABLE 300

| ITEM NAME 302 | CATEGORY 304 | ITEM DESCRIPTION 306 | PUBLIC RECORD ? 308 | ITEM NOTES 310 | OWNER 312 |
|---|---|---|---|---|---|
| EXECUTIVE BRANCH | FEDERAL LINKS | EXECUTIVE BRANCH MATERIALS | YES | INTERNET LINKS, ELECTRONIC FILES AND HARDCOPY DOCUMENTS RELATED TO THE EXECUTIVE BRANCH | SMITH |
| JUDICIAL BRANCH | FEDERAL LINKS | JUDICIAL BRANCH DESCRIPTION | NO | MY NOTES | LEE |

FIG. 3

INTERNET LINK TABLE

| WEB PAGE DESCRIPTION | WEB PAGE ADDRESS | ITEM | NOTES |
|---|---|---|---|
| WHITE HOUSE HOME PAGE | HTTP://WWW.WHITEHOUSE.GOV | EXECUTIVE BRANCH | MY NOTES ON WHITE HOUSE |
| PATENT OFFICE WEB SITE | HTTP://WWW.USPTO.GOV | EXECUTIVE BRANCH | NOTES ON PATENT OFFICE |

FIG. 4

HARDCOPY DOCUMENT TABLE

| HARDCOPY DESCRIPTION | HARDCOPY LOCATION | ITEM | NOTES |
|---|---|---|---|
| CONSTITUTIONAL LAW TEXT BOOK | LIVING ROOM TOP SHELF | EXECUTIVE BRANCH | MY OLD TEXT BOOK |

FIG. 6

DATABASE SYSTEM AND METHOD FOR ORGANIZING AND SHARING INFORMATION

CROSS REFERENCE TO RELATED APPLICATION

This invention claims priority under 35 U.S.C §119(e) to U.S. provisional application 60/224,265, titled "System and Method for Organizing Database Research" and filed Aug. 10, 2000.

BACKGROUND OF THE INVENTION

1. Field of the Invention

This invention relates to the field of organizing and sharing Internet web pages and web-accessed files, and other types of information in hardcopy or electronic formats.

2. Description of the Related Art

Web users typically use the "Bookmark" or "Favorites" feature in web browsers to mark certain web pages that they plan to revisit in the future. The marked web pages can also be grouped into folders. However, the "Bookmark" or "Favorites" feature does not provide sufficient flexibility. For example, the users cannot create and store detailed and length comments about the marked web pages. The folders and marked web pages cannot be easily shared among users. In addition, the folders and marked web pages cannot be conveniently used in the same application along with other documents and files that are not accessed through a web browser. The other documents and files include information stored in electronic or hardcopy format.

SUMMARY OF THE INVENTION

It is desirable to store the URLs (Uniform Resource Locator) of web pages and web-accessed files, the file access paths of electronic files, and the locations of hardcopy documents in a single database. It is also desirable to enable the user to enter and store comments about the web pages and web-accessed files, electronic files, and hardcopy documents in the database. Moreover, it is desirable to enable the user to organize the web pages and web-accessed files, electronic files, and hardcopy documents into hierarchical structures of categories, and to enable other users of the same database to have access to the web pages and web-accessed files, electronic files, hardcopy documents, and categories.

A database application enables Internet links, electronic files, and hardcopy documents to be organized and shared among users in a coherent application. Internet links include web pages and other files accessed through a web browser using a URL. Electronic files include electronic documents that are connected to the user's computer but are typically not accessed through a web browser. Hardcopy documents include, for example, books, periodicals, printouts, notebooks, and detached data recording media not connected to computers. For each Internet link, the database stores the URL, the user-entered comments, and the associated categories. For each electronic file, the database stores the file access path, the user-entered comments, and the associated categories. For each hardcopy document, the database stores the location, the user-entered comments, and the associated categories. Categories can form hierarchical structures, with one category being the sub-category of another category. The database, or a portion of the database, can reside on a user's local computer, on a computer connected to the user's computer on a local or wide area network, or on a remote computer accessible using a web browser. The stored categories, Internet links, electronic files, and hardcopy documents can be made available to other users that are granted access to the database.

The database application can launch other applications that enable the user to browse the web and to review electronic files. For example, the database application can launch a web browser session to enable the user to browse the web. When the web-browsing user wants to store a web page, the application enables the user to store the web page as an Internet link record in the database. When the user wants to revisit the web page, the user can issue a command on the stored Internet link record. The database application then launches a web browser session to navigate to the URL of the Internet link record. As another example, the database application can launch a Windows Explorer session to enable the user to explore files on the user's computer or on the user's computer network. When the file-exploring user wants to store a file, the application enables the user to store the file as an electronic file record in the database. When the user later wants to open the file, the user can issue a command on the stored electronic file record. Depending on the type of the electronic file, the database application then launches an appropriate application to open the electronic file. Alternatively, the database application launches a Windows Explorer session to navigate to the electronic file.

BRIEF DESCRIPTION OF THE DRAWINGS

FIG. 3 illustrates one embodiment of an item table.

FIG. 4 illustrates one embodiment of an Internet link table.

FIG. 6 illustrates one embodiment of a hardcopy document table.

DETAILED DESCRIPTION OF ILLUSTRATIVE EMBODIMENTS

Figure 1:
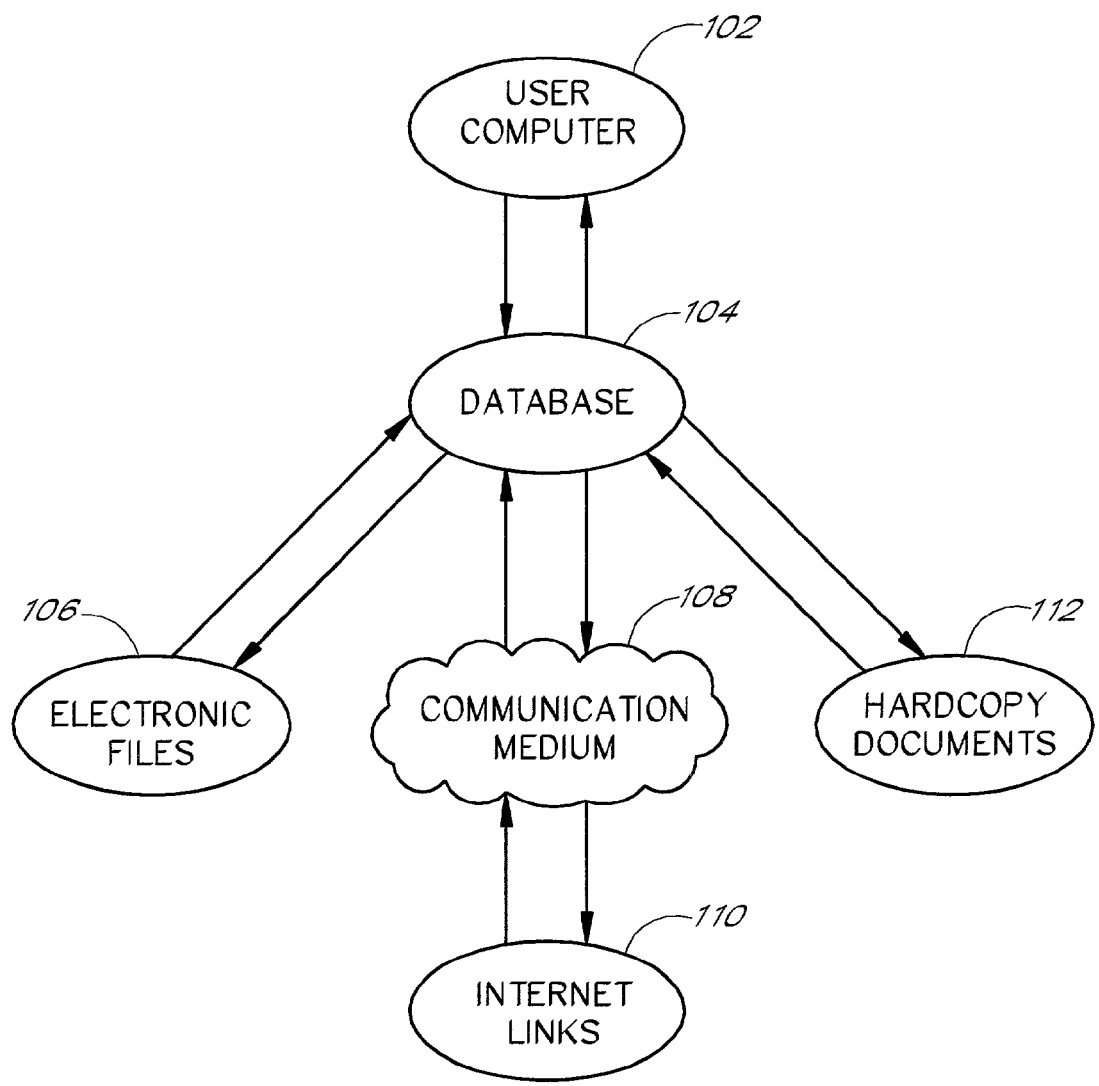
FIG. 1 illustrates one embodiment of a system for organizing and sharing resources using a database.

FIG. 1 illustrates one embodiment of a system for organizing and sharing resources using a database. A user computer 102 uses a web browser such as Microsoft Internet® Explorer or Netscape® Communicator to access Internet links 110 through communication medium 108. The user computer 102 can be a desktop computer, a laptop computer, a network appliance, a personal digital assistant, a wireless phone, or any other electronic device that can access a web site. The communication medium 108 is a wired or wireless network that connects the user computer 102 to the Internet links 110. The network can be the Internet or an Intranet. The Internet links 110 include web pages on the Internet or on an Intranet. In one embodiment, the Internet links 110 also include any files that may be accessed using a URL, such as PDF files and MP3 files that are accessible using a URL.

Electronic files 106 include electronic documents that can be accessed by the user computer 102 without using a web browser. The electronic files 106 are located on the user computer 102 or are connected to the user's network environment. However, as those skilled in the art will appreciate, in many cases, local and networked drives that store electronic documents can be presented to the user as web pages, and electronic documents can be presented to the user as web site documents. Hardcopy documents 112 include documents that are not stored on a web site and are not connected to the user computer 102. Hardcopy documents 112 include paper copies of documents, data storage media such as floppy disks and optical disks that are not connected to the user computer 102 and not connected to a web site, and any other information in hardcopy format.

As will be described below, a database 104 stores records of electronic files 106, Internet links 110, and hardcopy documents 112. Using the database 104, the user can organize resources, including electronic files, Internet links, and hardcopy documents. In one embodiment, the database 104 resides only locally on the user computer 102, and is not accessible to other users. In another embodiment, the database 104 resides on a computer connected to an Intranet, and can be accessed by other users on the same Intranet. In yet another embodiment, the database 104 resides on a remote computer accessible through the Internet, and can be accessed using web browsers by users that are granted access to the database.

The user computer 102 can access records of the electronic files 106, the Internet links 110, and the hardcopy documents 112, through the database 104. The user computer 102 can access the communication medium 108 and navigate to the Internet links 110, without first going through the database 104. The database 104 may be located on the user computer 102, or on another computer connected to the user computer 102 through a local or wide area network. The database 104 may be located on a computer at a web site. For example, the user computer 102 may access the database 104 through the communication medium 108. The user may access electronic files 106 through an application such as Windows Explorer, without first going through the database 104. The user may locate and review hardcopy documents 112, without first going through the database 104. The user may then access the database 104 to store the records of the electronic files 106, Internet links 110, or hardcopy documents 112 into the database 104.

Figure 2:
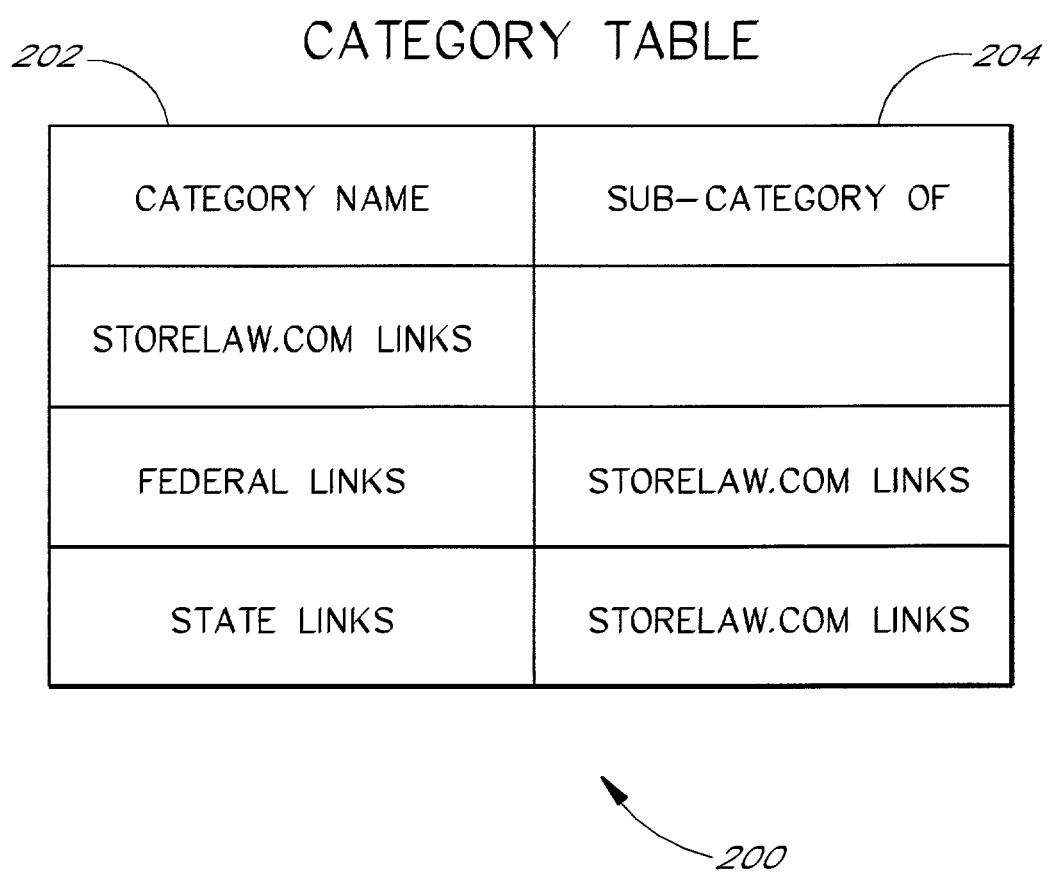
FIG. 2 illustrates one embodiment of a category table.

FIG. 2 illustrates one embodiment of a category table 200. As shown in FIG. 2, the category table 200 includes a category name field 202, and a sub-category field 204. The category name field 202 stores the name of the category. The sub-category field 204 indicates whether the category is a sub-category of another category. For example, since the category "Federal Links" has a sub-category field of "StoreLaw.com Links", the category of "Federal Links" is a sub-category of "StoreLaw.com Links." As those skilled in the art will appreciate, other methods can also be used to define the hierarchical relationship between two entities. For example, links can be used to define the relationships among entities. Other fields, such as a unique numeric identifier, can be included in the category table to define records. In the embodiment shown in FIG. 2, the category name field 202 uniquely identifies category records. Additional fields, such as a description field or a notes field to store description and notes about the category, can also be included in the category table 200.

FIG. 3 illustrates one embodiment of an item table 300. The item table 300 includes an item name field 302, a category field 304, an item description field 306, a shared record field 308, an item notes field 310, and an owner field 312. The item name field 302 stores the name of the item. It also uniquely identifies the item record. In another embodiment, an additional identifier field uniquely identifies the item record. The category field 304 stores the name of the category of the item. The value in the category field 304 corresponds to a value in the category name field 202 of category table 200. Each category may include one or more items.

In another embodiment, an item can be associated with multiple categories. For example, within an item record, the category field 304 can store multiple category names, with each category name corresponding to a category associated with the item. As another example, multiple records can be created for the same item, with each record associated with a category.

The item description field 306 stores a description of the item. The user can use this field to store comments about the item. The shared record field 308 stores a logical value that indicates whether this item is a shared record. If the item is a shared record, then the field values of the item can be shared by other users. The field values of its associated Internet links, electronic files, and hardcopy documents can also be shared by other users. In another embodiment, some fields of the item can each be individually designated as shared or not shared. For example, the item description field 306 and the item notes field 310 can each be individually designated as shared or not shared. Therefore, a user who created the item record can designate one field to be not shared, and another field to be shared. The fields of the Internet links, electronic files, and hardcopy documents may also be individually designated as shared or not shared. As those skilled in the art will appreciate, in some instances, a computer system administrator or database administrator advantageously has access to all records in a database, regardless of their designation as shared or not shared.

The item notes field 310 stores notes about the item. The user can use this field to store comments about the item. The owner field 312 stores the identifier of the owner of the item. In a preferred embodiment, the owner is the user who created the item. An owner can set the shared record field 308 to "no" or false, so that other users cannot share the item record. In one embodiment, the item table also includes a user group field, which stores the values of user groups that are enabled to share the item.

An item may be associated with one or more Internet links, electronic files, and hardcopy documents. FIG. 4 illustrates one embodiment of an Internet link table 400. The Internet link table 400 includes a web page description field 402, a web page address field 404, an item field 406, and a notes field 408. The web page description field 402 stores a description of the web page. The web page address field 404 stores the URL to the web page. The item field 406 identifies the item associated with the Internet link. The item field 406 corresponds to the item name field 302 of the item table 300. The notes field 408 stores notes about the Internet link. The web page description field 402 typically stores a brief summary of the web page. The notes field 408 typically stores lengthier and more detailed comments about the Internet link. In one embodiment, the web page description field 402 uniquely identifies an Internet link record. In another embodiment, the web page address field 404 uniquely identifies an Internet link record. In yet another embodiment, an additional identifier uniquely identifies an Internet link record.

Figure 5:
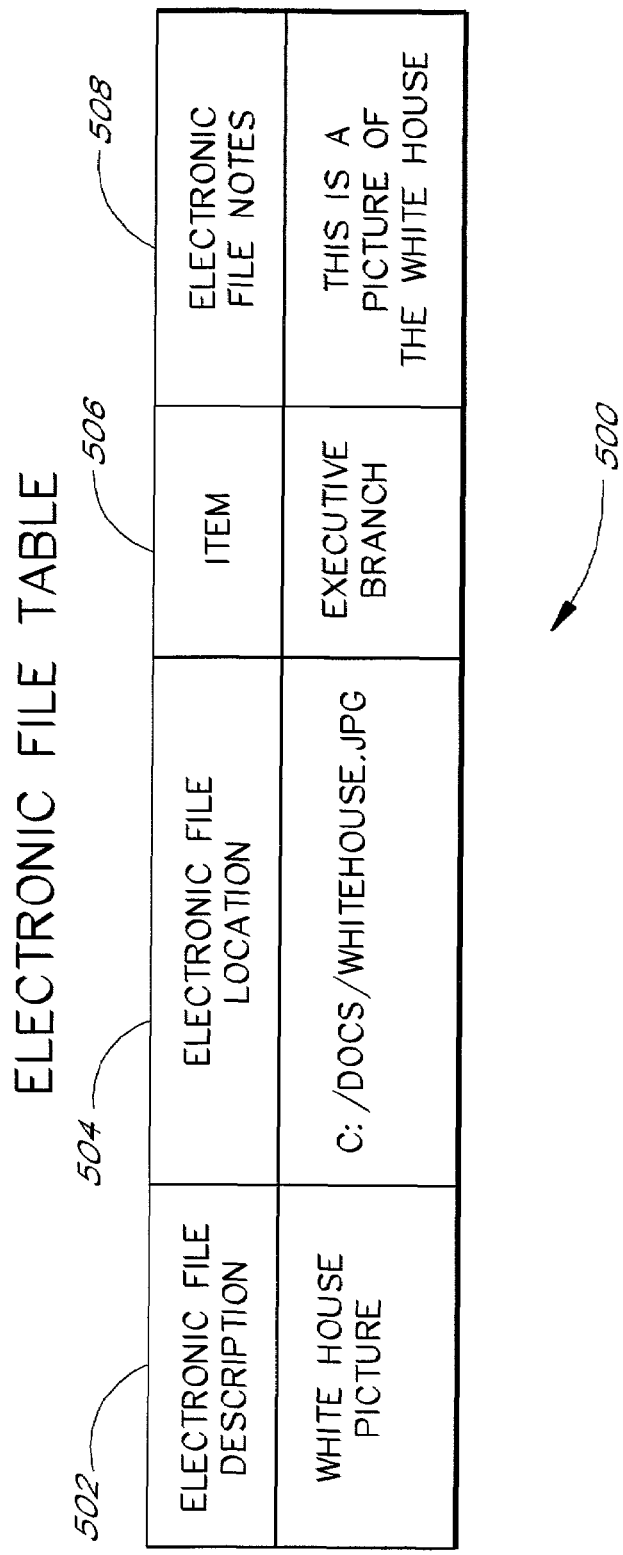
FIG. 5 illustrates one embodiment of an electronic file table.

FIG. 5 illustrates one embodiment of an electronic file table 500. The electronic file table 500 includes an electronic file description field 502, an electronic file location field 504, an item field 506, and an electronic file notes field 508. The electronic file description field 502 stores a description of the electronic file. The electronic file location field 504 stores the location of the electronic field. The location of an electronic file is a text string that identifies the file. It is typically the file access path of the file. The item field 506 identifies the item associated with the electronic file. The item field 506 corresponds to the item name field 302 of the item table 300. The electronic file notes field 508 stores notes about the electronic file. The electronic file description field 502 typically stores a brief summary of the electronic file. The electronic file notes field 508 typically stores lengthier and more detailed comments about the electronic file. In one embodiment, the electronic file description field 502 uniquely identifies an electronic file. In another embodiment, the electronic file location field 504 uniquely identifies an electronic file. In yet another embodiment, an additional identifier uniquely identifies an electronic file.

As those skilled in the art will recognize, an electronic file located on a user's computer or within the user's network environment can be accessed by an application that is similar to a web browser, such as a Windows Explorer. Although the file access paths of electronic files are not true URLs, the electronic files can be displayed using a web browser like application. In one embodiment, a user can store an electronic file, including its file access path and user-entered comments, as an Internet link record. The file access path can be stored as a pseudo URL. The user can also store an Internet link as an electronic file record. The URL can be stored as a pseudo file access path. This embodiment provides flexibility and user-friendliness to certain users.

FIG. 6 illustrates one embodiment of a hardcopy document table 600. A hardcopy document can be a book, a magazine, a printout, a notebook, an article in a book or a magazine, and any information in hardcopy format. A detached data-recording medium, such as a floppy disk or optical disk not connected to a computer, can also be defined as a hardcopy document. The hardcopy document table 600 includes a hardcopy description field 602, a hardcopy location field 604, an item field 606, and a hardcopy notes field 608. The hardcopy description field 602 stores a description of the hardcopy document. In one embodiment, the hardcopy description field 602 uniquely identifies a hardcopy document. In another embodiment, an additional identifier uniquely identifies a hardcopy document. The hardcopy location field 604 stores the physical location of the hardcopy document, such as its location in a room or in a drawer. The hardcopy location field 604 can also store another identification of the hardcopy document, such as its book title, page number, and so forth. The item field 606 identifies the item associated with the hardcopy document. The item field 606 corresponds to the item name field 302 of the item table 300. The hardcopy notes field 608 stores notes about the hardcopy document. The hard copy description field 602 typically stores a brief summary of the hard copy document. The hardcopy notes field 608 typically stores lengthier and more detailed comments about the hardcopy document.

In the embodiments described above in connection with FIGS. 3–6, the Internet link table 400, the electronic file table 500, and the hardcopy document table 600 each includes an item field to refer to the associated item record. In another embodiment, the item table 300 includes additional fields to store identifiers to Internet link records, electronic file records, and hardcopy document records associated with the item. In another embodiment, the Internet links, electronic files, and hardcopy documents are associated directly with one or more categories.

In one embodiment, an Internet link, an electronic file, or a hardcopy document can be associated with multiple items. Such an embodiment can be implemented in a number of ways. For example, the item fields 406, 506, and 606 in the tables 400, 500, and 600 can each store multiple item names. The multiple item names can be separated by a delimiter such as a comma or a semicolon. The multiple items names can also be stored in an item field 406, 506, or 606 as a list of entries. As another example, multiple Internet link records, multiple electronic file records, or multiple hardcopy document records can be created, with each record associated with an item.

Figure 7:
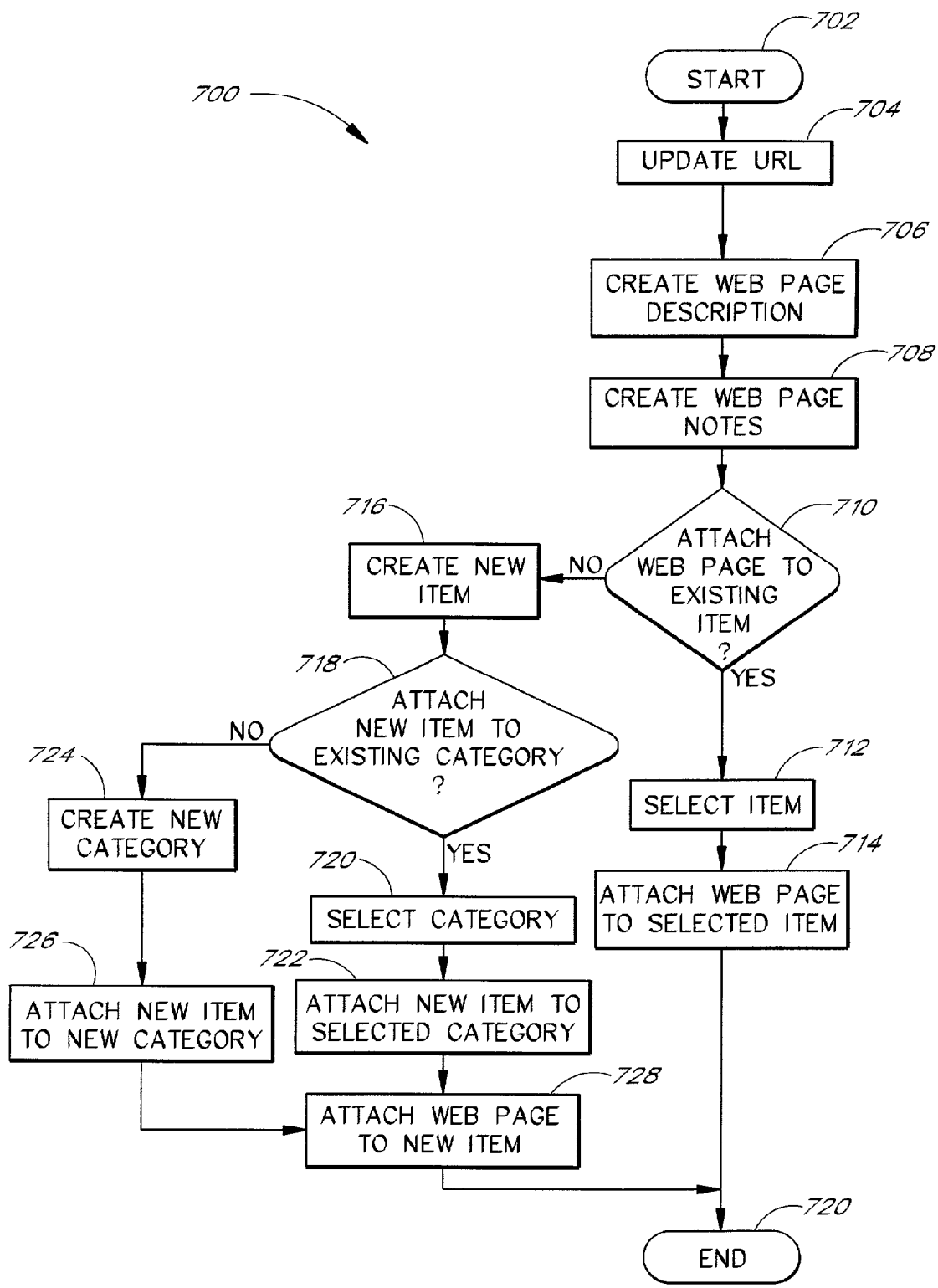
FIG. 7 illustrates one embodiment of a user storing a web page.

FIG. 7 illustrates one embodiment of a user storing a web page or web-accessed file. A flowchart 700 is shown in FIG. 7. From a database application, the user launches a web browser session to navigate to a web site. In one version, the database application is written in Microsoft Access. In another version, the database application is written in FoxPro. In yet another version, the database application is written in SQL. The application can also be written in other platforms, languages and operating systems. In one embodiment described below in connection with FIG. 8, the user selects a "Go To Web" button 816 in FIG. 8 to access a web site from the database application. The database application then launches a web browser session to enable the user to surf the web. In one embodiment, a screen 900 of FIG. 9 is displayed to the user.

When the user is ready to store a web page or a web-accessed file as an Internet link record, the user issues a command to the database application. In one embodiment described below in connection with FIG. 9, the user selects a "Store Web Page" button 908 to start the storing web page process.

As shown by the flowchart 700 in FIG. 7, from a start block 702, the process proceeds to a block 704, where the user is prompted to update the URL of the current web page or the current web-accessed file. If the user changes the URL, an Internet link other than the current page or file will be stored. In one embodiment, the user cannot update the URL of the current web page or current web-accessed file. The URL is stored in the web page address field 404 (FIG. 4).

The process proceeds to a block 706, where the user is prompted to enter a web page description for the web page description field 402. In one embodiment in which the web page description field 402 is used as a unique identifier of Internet link records, the user must enter a unique web page description.

The process proceeds to a block 708, where the user is prompted to enter notes for the web page notes field 408. An Internet link record is created, with user-entered values in the web page description field 402, web page address field 404, and web page notes field 408.

The process proceeds to a block 710, where a determination is made as to whether the user wants to attach the Internet link record to an existing item, i.e., to associate the Internet link record with an existing item. If the determination is yes, then the process proceeds to a block 712, otherwise the process proceeds to a block 716. At the block 712, the user is prompted to select an item from existing item records. In one embodiment, the user is prompted to select from existing item records that are owned by the user, or owned by others but can be shared. An item record with a "shared record" field 308 of "yes" or true can be shared with others.

From the block 712, the process proceeds to a block 714, where the selected item is associated with the Internet link. The item field 406 of the Internet link record stores the item name of the selected item. From the block 714, the process proceeds to an end block 730.

If the user wants to create a new item to be associated with the Internet link, the user creates a new item at the block 716. The user enters values for the fields in item table 300. The process proceeds to a block 718, where a determination is made as to whether to associate the item with an existing category or with a new category. If the user wants to associate the item with an existing category, the process proceeds to a block 720, where the user is prompted to select an existing category. Otherwise the process proceeds to a block 724, where the user creates a new category.

At the block 720, the user selects a category from existing categories. In one embodiment, the user is prompted to select from category records that are owned by the user, or owned by others but can be shared.

From the block 720, the process proceeds to a block 722, where the selected category is associated with the new item. The process proceeds from the block 722 to a block 728, where the Internet link is associated with the new item. The item field 406 of the Internet link record stores the item name of the new item. In another embodiment, the user can repeat the part of the process starting at the block 710, to associate the Internet link with multiple items. The process proceeds from the block 728 to the end block 730.

At the block 724, the user creates a new category. The user may identify the new category as a sub-category of an existing category. The process proceeds to a block 726, where the user associates the new item with the newly created category. From the block 726, the process proceeds to the block 728. In another embodiment, the user can repeat the part of the process starting at the block 718, to associate the newly created item with multiple categories.

An Internet link is typically a web page with a URL. It can also be a file accessible through a browser from a web page, such as a PDF file, a MP3 file, a JPG file, and so forth. In another embodiment, a document accessible from a web page can also be stored as an electronic file, with the electronic file location field 504 storing the URL to the document.

As illustrated in FIG. 7, an Internet link is associated with an item. An electronic file and a hardcopy document can also be associated with an item. In another embodiment, an Internet link, an electronic file, and a hardcopy document can be associated directly with a category. As those skilled in the art will recognize, in a hierarchical structure of categories and items, an item can be thought of as a category or sub-category at the bottom level.

Figure 8:
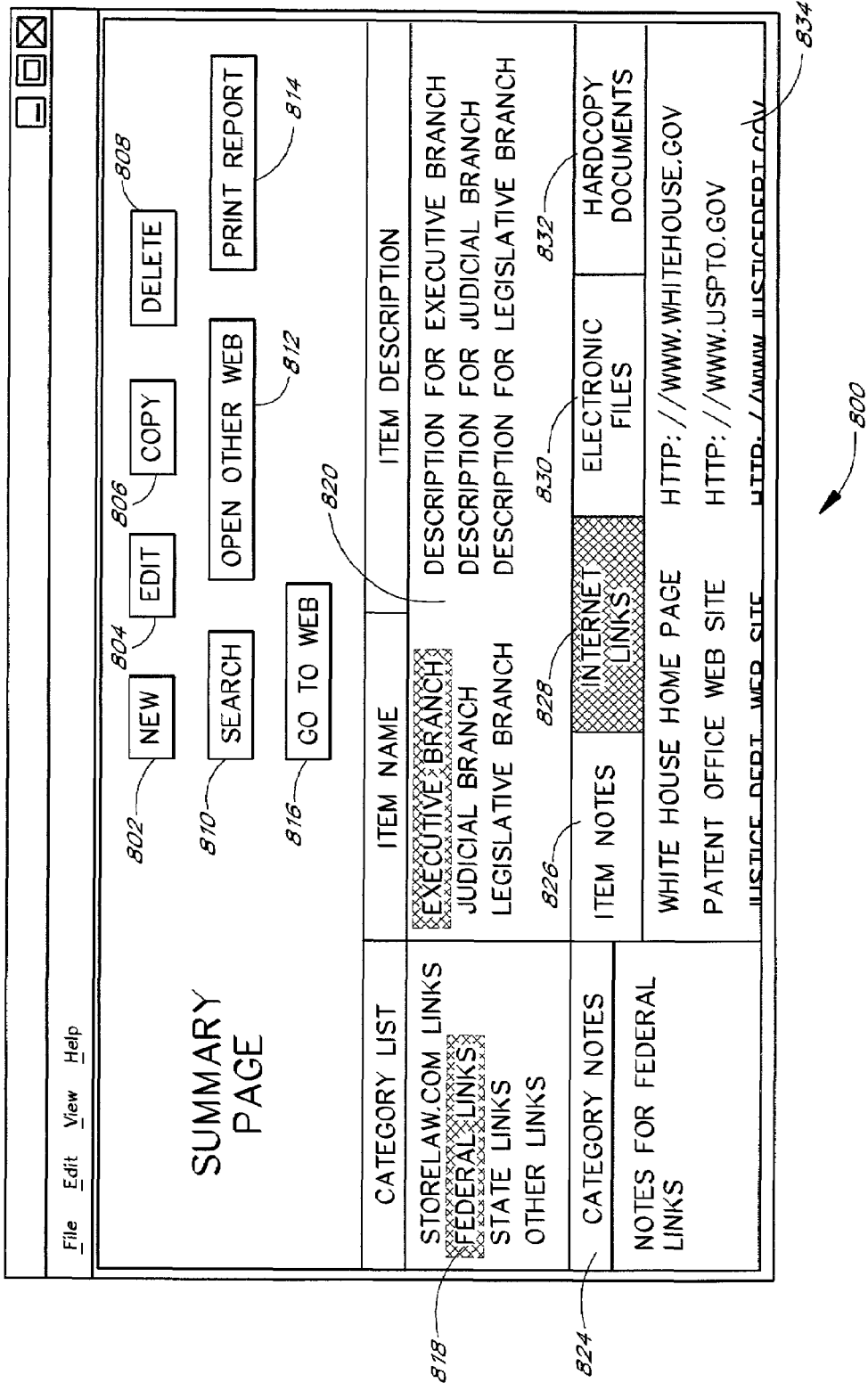
FIG. 8 is a sample screen of one embodiment of a user interface.
Figure 9:
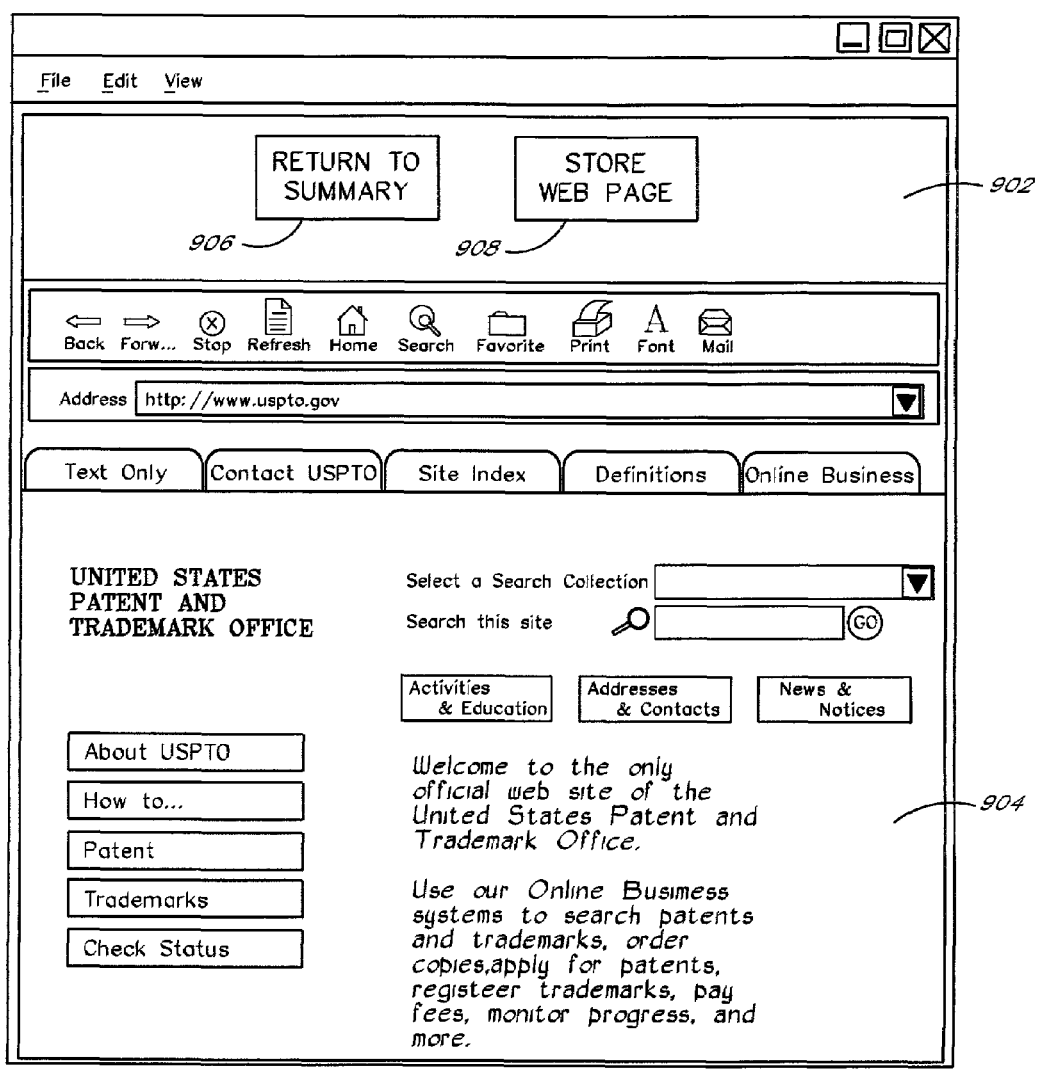
FIG. 9 is a sample screen of one embodiment of a user interface permitting a web-browsing user to store Internet links into a database application.

FIG. 8 is a sample screen of one embodiment of a user interface. It is a sample summary page of a database application. Referring to the middle and bottom portions of the screen 800, the screen 800 displays a list of category names in an area 818. Category notes for the highlighted category ("Federal Links") are displayed in an area 824. The names and descriptions for the items associated with the highlighted category are displayed in area 820. When the user clicks on a "Item Notes" tab 826, the item notes of the item highlighted in the area 820 are displayed in area 834. When the user clicks on a "Internet Links" tab 828, a "Electronic Files" tab 830, or a "Hardcopy Documents" tab 832, the Internet links, the electronic files, or the hardcopy documents respectively associated with the highlighted item are displayed in an area 834. In FIG. 8, the area 834 displays the web page descriptions and URLs of the Internet links associated with the highlighted "Executive Branch" item. The web page notes and other information of the Internet links can also be displayed. The user can highlight an Internet link, an electronic file, or a hardcopy document that is displayed in the area 834.

Referring to the top portion of the screen 800, when the user clicks on the "New" button 802, the user is prompted to create a new category, a new item, a new Internet link, a new electronic file, or a new hardcopy document. When the user clicks on the "Edit" button 804, the user is prompted to edit a category, item, Internet link, electronic file, or hardcopy document that is highlighted. Embodiments of tables have been described above in connection with FIGS. 2–6, and the tables can be created and edited accordingly.

When the user clicks the "Copy" button 806, the user is prompted to select a "Copy to" category. When an Internet link, an electronic file, or a hardcopy document is highlighted in the area 834, the highlighted Internet link, electronic file, or hardcopy document is copied to be also associated with the selected "Copy to" category. When an item is highlighted in the area 820, the highlighted item is copied to be also associated with the selected "Copy to" category. In another embodiment, a "Move" button is provided to de-associate the highlighted Internet link, electronic file, hardcopy document, or item with its currently associated category, and to be associated with a selected "Move to" category.

When the user clicks the "Delete" button 808, the highlighted Internet link, electronic file, hardcopy document, item, or category is deleted. In one embodiment, when an item record is deleted, its associated records of Internet links, electronic files, and hardcopy documents are also deleted. In one embodiment, when a category is deleted, its associated sub-categories and items are also deleted.

When the user clicks the "Search" button 810, the user is prompted to enter a keyword. The database application searches its records looking for complete or partial matches with the keyword. Other search methods, such as Boolean searching or natural language searching, can also be implemented. In one embodiment, the applications searches for values in the category name field 202, the item name field 302, the item description field 306, the web page description field 402, the electronic file description field 502, and the hardcopy description field 602, looking for complete or partial matches with the keyword. Other fields may also be searched in looking for matches. The search results are displayed to the user.

When the user clicks the "Open Other User" button 812, the user is prompted to select another user from a list of users. The records of the other user are then displayed. In one embodiment, the user must have a system administrator's privilege to open other users' records. In one embodiment, the user can only open other users that belong to the same user group as him or her. In one embodiment, the user can open other users, but cannot view records owned by other users that are designated as not shared. In one embodiment, the category table includes an additional owner field, so that each category has a particular owner. The owner of a category is typically the user that created the category.

When the user clicks the "Print Report" button 814, the user is displayed a preview of a report that lists all categories, their associated items, and the Internet links, electronic files, and hardcopy documents associated with the items. The report can be printed by a printer. In one embodiment, the user can select only some of the categories or items for printing. In one embodiment, the user can only print a report of the records that belong to the user. As those skilled in the art will appreciate, once information is stored in the database, the records owned by the user, and other records that can be shared by the user, can be manipulated by the user in a number of ways. In one embodiment, for each of the Internet link records to be printed, the use can select an option to print out the web page corresponding to the Internet link record. For example, the application automatically launches a web browser to navigate to the URL identified by the web address field 404 of the Internet link record, and prints the web page as part of the report. The report also includes the notes field 408 of the Internet link record. Therefore, a user can read a paper copy of the web page in conjunction with the notes. The application can also print out a file identified by the file location field 504 of the electronic file record, along with the notes field 508 of the same record.

When the user clicks the "Go To Web" button 816, the database application launches a browser session that can access web sites. If an Internet link record is displayed and highlighted in the area 834, the web browser will navigate to the URL of the highlighted Internet link. One embodiment of a subsequent screen is shown in FIG. 9.

In one embodiment, when the user double-clicks on an Internet link displayed in the area 834, the application launches a web browser session to navigate to the Internet link. When the user double-clicks on an electronic file displayed in the area 834, the user computer opens the electronic file. Depending on the type of the electronic file, the user computer uses an appropriate application to open the file. For example, a file with extension ".doc" can be opened by a Microsoft Word application. Alternatively, the database application launches a Windows Explorer session to navigate to the electronic file. In another embodiment, when the user double-clicks on a record displayed in the area 834, the user is prompted to edit the record. For example, when the user double-clicks on an Internet link record displayed in the area 834, the user can edit the description field 402, the web page address field 404, the item field 406, and the notes field 408 of the record. In yet another embodiment, when the user right-clicks on a record in the area 834, the user is prompted to select from a list of choices, such as "Edit Record", "Delete Record", "Go To Web Page", "Open File", and so forth.

FIG. 9 is a sample screen of one embodiment of a user interface permitting a web-browsing user to store Internet links into a database application. The screen 900 includes an area 902 and an area 904. After the user clicks the "Go To Web" button 816 in FIG. 8, the user can browse the web using the area 904 of screen 900 in FIG. 9. The area 904 can be a browser window such as a Microsoft® Internet Explorer or Netscape® Communicator window. In a preferred embodiment, it is resized automatically by the database application, so that the area 902 and the area 904 are displayed as top and bottom portions on the same screen 900. The area 902 includes a "Return to Summary" button 906 and a "Store Web Page" button 908. In one embodiment, when an Internet link record in the database corresponds to the current web page in the area 904, the area 902 also displays at least a portion of the Internet link record, for example, the values of web page description field 402 and web page notes field 408. Therefore a user can review the web page in the area 904, and also review in the area 902 the comments previously entered by the user or another user. In one implementation, the user can also modify in the area 902 the values of web page description field 402 or web page notes field 408.

As those skilled in the art will appreciate, the area 902 and the area 904 can be displayed in many ways. For example, the area 902 can appear in a left side of the screen, and the area 904 can appear in a right side of the screen. As another example, the area 902 and the area 904 can overlap each other, with one area in the foreground and another area in the background.

When the user clicks the "Return to Summary" button 906, the database application returns to the screen 800 of FIG. 8. When the user clicks the "Store Web Page" button 908, the user is prompted to store the web page that is displayed in the area 904. One embodiment of the storing web page process is displayed in FIG. 7. In another embodiment, the "Store Web Page" button is located on the tool bar of the web browser. When the button is clicked, the user is prompted to store the web page that is displayed in the area 904.

In one embodiment, the database application also includes an "Explore My Computer" button (not shown). The button can be displayed, for example, in the area 902 of FIG. 9 or in the top portion of FIG. 8. When the user clicks the button, the computer files on the user's computer or on the user computer's network are displayed in the area 904. The user can explore the files, for example by navigating through the drives and directories, and opening and closing files. In one embodiment, the database application launches a Windows Explorer session to display files. The database application preferably resizes the Windows Explorer window, so that the area 902 and the area 904 are displayed as top and bottom portions on the same screen 900. The database application can also launch another application to display the files on the user's computer or on the user computer's network. The user can select a file to store as an electronic file. The process of storing an electronic file is similar to the process of storing an Internet link-the user enters description and notes to be stored with the electronic file record. The user also associates the electronic file with one or more items. One or more Internet links, electronic files, and hardcopy documents can be associated with the same item.

The database application can be used in many fields. One of the uses is in the field of legal research. A large quantity of legally related documents, including case opinions, statutes, treatises and law journal articles can be accessed through a web browser. The database application enables a legal researcher to mark these documents as Internet links, and enter comments in the description and notes fields to preserve his or her thoughts regarding these documents. The Internet links can be organized by categories and subcategories. For example, cases reviewed during a particular legal research task can be grouped together. The legal researcher may have consulted other documents such as electronic files and hardcopy documents during the research. These documents can also be organized along with the web pages. In one embodiment, an Internet link, electronic file, or hardcopy document can be associated with multiple items or multiple categories. For example, if the legal researcher has found an article that is related to two categories, the legal researcher can associate the article with both categories.

The database application enables users to share records created by others. For example, if an item "2000 U.S. Supreme Court Decisions" has been created and includes Internet links to all U.S. Supreme Court decisions of the 2000 term, then other users can share the list, including the URL of each of the cases, and notes about each of the cases.

From the database application, a user can launch a web browser session to navigate to the URL of each of the cases.

The foregoing description details certain embodiments of the invention. It will be appreciated, however, that the invention can be practiced in many ways. For example, although the foregoing describes records stored in a category table, an item table, an Internet links table, an electronic files table and a hardcopy documents table, the above-described tables can be combined into fewer tables or separated into more tables. Some data fields can be moved to other tables or duplicated in other tables. Although the database and the tables are preferably in relational form, they can also be implemented as object-oriented database and tables, or as a combination of object-oriented and relational database and tables. It should also be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of organizing and sharing Internet links, electronic files and hardcopy documents, the method comprising:

enabling a user to enter comments about an Internet link;

storing the entered comments about the Internet link and a URL of the Internet link in an Internet link record in a database;

associating the Internet link record with a category or an item;

enabling the user to enter comments about an electronic file;

storing the entered comments about the electronic file and, a file access path of the electronic file in an electronic file record in the database;

associating the electronic file record with a category or an item;

enabling the user to enter comments about a hardcopy document;

storing the entered comments about the hardcopy document and a description of the physical location of the hardcopy document in a hardcopy document record in the database;

associating the hardcopy document record with a category or an item;

enabling the user to designate categories in the database as shared or not shared;

making Internet link records, electronic file records, and hardcopy document records associated with a category designated as not shared accessible only to the user that created the category;

making Internet link records, electronic file records, and hardcopy document records associated with shared categories accessible to other users that use the database; and enabling the user to associate one or more Internet link records, electronic file records, and hardcopy document records with a same category or a same item.

2. The method of claim 1, wherein enabling a user to enter comments about an Internet link comprises enabling the user to enter a summary in a description filed of the Internet link record, and enabling the user to enter other comments in a notes field of the Internet link record.

3. The method of claire 1, wherein enabling a user to enter comments about an electronic file comprises enabling the user to enter a summary in a description filed of the electronic file record, and enabling the user to enter other comments in a notes field of the electronic file record.

4. The method of claim 1, wherein enabling a user to enter comments about a hardcopy document comprises enabling the user to enter a summary in a description filed of the hardcopy document record, and enabling the user to enter other comments in a notes field of the hardcopy document record.

5. The method of claim 1, wherein an item is associated with a category.

6. The method of claim 1, wherein a category can be associated with another category.

7. The method of claim 1, wherein an item can be associated with one or more categories.

8. The method of claim 1, further comprising enabling the user to associate the Internet link record with another category or another item.

9. The method of claim 1, further comprising enabling the user to associate the electronic file record with another category or another item.

10. The method of claim 1, further comprising enabling the user to associate the hardcopy document record with another category or another item.

11. The method of claim 1, wherein one or more Internet link records, one or more electronic file records, and one or more hardcopy document records can be associated with a same category or a same item.

12. The method of claim 1, further comprising:

enabling the user to designate Internet link records in the database as shared or not shared;

enabling the user to designate electronic file records in the database as shared or not shared;

enabling the user to designate hardcopy document records in the database as shared or not shared; and making the shared Internet link records, the shared electronic file records, and the shared hardcopy document records available to other users that use the database.

13. The method of claim 1, further comprising:

enabling the user to designate fields of Internet link records in the database as shared or not shared;

enabling the user to designate fields of electronic file records in the database as shared or not shared;

enabling the user to designate fields of hardcopy document records in the database as shared or not shared; and making the shared Internet link record fields, the shared electronic file record fields, and the shared hardcopy document record fields available to other users that use the database.

14. The method of claim 1, further comprising:

enabling the user to designate items in the database as shared or not shared; and making Internet link records, electronic file records, and hardcopy document records associated with the shared items accessible to other users that use the database.

15. The method of claim 1, further comprising generating a report of at least a portion of the Internet link records, electronic file records, and hardcopy document records stored in the database.

16. The method of claim 15, further comprising printing at least a portion of a web page identified by the stored URL of a Internet link record, and printing the stored entered comments of the Internet link record.

17. The method of claim 15, further comprising printing at least a portion of a file identified by the stored file access path of a electronic file record, and printing the stored entered comments of the electronic file record.

18. The method of claim 1, wherein the description of the physical location of the hardcopy document comprises a description of a room and/or a drawer in which the hardcopy document is located.

19. The method of claim 1, wherein the description of the physical location of the hardcopy document comprises a description of a book title and/or a page number at which the hardcopy document is located.

20. A method of organizing and sharing Internet links and hardcopy documents, the method comprising:
 enabling a user to navigate to an Internet link using a web browser;
 enabling the user to enter notes about the Internet link;
 storing the entered notes about the Internet link and a URL of the Internet link in an Internet link record of a database;
 associating the Internet link record with a category;
 enabling the user to enter notes about a hardcopy document;
 storing the entered notes about the hardcopy document and a description of the physical location of the hardcopy document in a hardcopy document record of the database;
 associating the hardcopy document record with a category;
 enabling the user to designate categories in the database as shared or not shared;
 making Internet link records and hardcopy document records associated with a category designated as not shared accessible only to the user that created the category;
 making Internet link records and hardcopy document records associated with shared categories accessible to other users that use the database; and
 enabling the user to associate one or more Internet link records, and hardcopy document records with a same category or a same item.

21. A method of organizing and sharing electronic files and hardcopy documents, the method comprising:
 enabling a user to navigate to an electronic file using a computer;
 enabling the user to enter notes about the electronic file;
 storing the entered notes about the electronic file and a file access path of the electronic file in an electronic file record of a database;
 associating the electronic file record with a category;
 enabling the user to enter notes about a hardcopy document;
 storing the entered notes about the hardcopy document and a description of the physical location of the hardcopy document in a hardcopy document record of the database;
 associating the hardcopy document record with a category;
 enabling the user to designate categories in the database as shared or not shared;
 making electronic file records and hardcopy document records associated with a category designated as not shared accessible only to the user that created the category;
 making electronic file records and hardcopy document records associated with shared categories accessible to other users that use the database; and
 enabling the user to associate one or more electronic file records, and hardcopy document records with a same category or a same item.

22. A database that facilitates the organizing and sharing of Internet links, electronic files and hardcopy documents, the database comprising:
 category records, wherein a category can be a subcategory of another category;
 Internet link records storing at least the URL, associated categories and user entered comments of each of a plurality of Internet links;
 electronic file records storing at least the file access path, associated categories and user entered comments of each of a plurality of electronic files; and
 hardcopy document records storing at least a description of the physical location, associated categories and user entered continents of each of a plurality of hardcopy documents,
 wherein an Internet link record, an electronic file record, and a hardcopy document record can be associated with a same category, and
 wherein each of the category records stores a shared or 100t-shared designation of the category,
 wherein Internet link records, electronic file records, and hardcopy document records associated with a not shared category are accessible to the user that created the category, and
 wherein internet link records, electronic file records, and hardcopy document records associated with a shared category are accessible to the user that created the category and accessible to other users that use the database.

23. The database of claim 22, wherein each of the Internet link records further stores a shared or not shared designation of the Internet link, wherein not shared Internet link records are accessible to the user that created the not shared Internet link records, and wherein shared Internet link records are accessible to the user that created the shared Internet link records and accessible to other users that use the database.

24. The database of claim 22, wherein each of the electronic file records further stores a shared or not shared designation of the electronic file, wherein not shared electronic file records are accessible to the user that created the not shared electronic file records, and wherein shared electronic file records are accessible to the user that created the shared electronic file records and accessible to other users that use the database.

25. The database of claim 22, wherein each of the hardcopy document records further stores a shared or not shared designation of the hardcopy document, wherein not shared hardcopy document records are accessible to the user that created the not shared hardcopy document records, and wherein shared hardcopy document records are accessible to the user that created the shared hardcopy document records and accessible to other users that use the database.

26. The database of claim 22, wherein the database is a relational database.

27. The database of claim 22, wherein the database is an object-oriented database.

28. The database of claim 22, wherein the description of the physical location of each of the plurality of hardcopy documents comprises a description of a room and/or a drawer in which the hardcopy documents are located.

29. The database of claim 22, wherein the description of the physical location of each of the plurality of hardcopy documents comprises a description of a book title and/or a page number at which the hardcopy documents are located.

30. A database that facilitates the organizing and sharing of Internet links and hardcopy documents, the database comprising:

category records, wherein a category is a sub-category of another category;

Internet link records storing at least the URL, associated categories and user entered notes of each of a plurality of Internet links; and hardcopy document records storing at least a description of the physical location, associated categories and user entered notes of each of a plurality of hardcopy documents, wherein an Internet link record and a hardcopy document record are associated with a same category, wherein each of the category records stores a shared or not shared designation of the category, wherein Internet link records and hardcopy document records associated with a not shared category are accessible to the user that created the category, and wherein internet link records and hardcopy document records associated with a shared category are accessible to the user that created the category and accessible to other users that use the database.

31. A database that facilitates the organizing and sharing of electronic files and hardcopy documents, the database comprising;

category records, wherein a category is a sub-category of another category;

electronic file records storing at least the file access path, associated categories and user entered notes of each of a plurality of electronic files; and hardcopy document records storing at least a description of the physical location, associated categories and user entered notes of each of a plurality of hardcopy documents, wherein an electronic file record and a hardcopy document record are associated with a same category, wherein each of the category records stores a shared or not shared designation of the category, wherein electronic file records and hardcopy document records associated with a not shared category are accessible to the user that created the category, and wherein electronic file records and hardcopy document records associated with a shared category are accessible to the user that created the category and accessible to other users that use the database.

\* \* \* \* \*